US010258200B2

(12) United States Patent
Wolf et al.

(10) Patent No.: US 10,258,200 B2
(45) Date of Patent: *Apr. 16, 2019

(54) IMPLEMENT WITH TELESCOPICALLY MOVABLE STEM FOR STIRRING OR COMMINUTING FOOD

(71) Applicant: De'Longhi Braun Household GmbH, Neu-Isenburg (DE)

(72) Inventors: Jurgen Wolf, Kriftel (DE); Christian Stenglein, Frankfurt am Main (DE); Sabine Buhl-Remmel, Schwalbach am Taunus (DE); Christian Dexheimer, Langen (DE); Christof Kleemann, Bad Homburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/567,740

(22) PCT Filed: Apr. 18, 2016

(86) PCT No.: PCT/EP2016/058528
§ 371 (c)(1),
(2) Date: Oct. 19, 2017

(87) PCT Pub. No.: WO2016/169883
PCT Pub. Date: Oct. 27, 2016

(65) Prior Publication Data
US 2018/0116464 A1    May 3, 2018

(30) Foreign Application Priority Data
Apr. 21, 2015   (DE) .................. 10 2015 207 196

(51) Int. Cl.
*A47J 43/07*  (2006.01)
*A47J 43/044* (2006.01)
(Continued)

(52) U.S. Cl.
CPC .......... *A47J 43/0711* (2013.01); *A47J 43/06* (2013.01); *A47J 43/082* (2013.01); *B01F 7/00608* (2013.01); *A47J 2043/04427* (2013.01)

(58) Field of Classification Search
CPC .......... A47J 2043/04427; A47J 43/0755; A47J 43/0711; A47J 43/082; A47J 43/06;
(Continued)

(56) References Cited

U.S. PATENT DOCUMENTS 1,412,401 A    4/1922   Gotfredsen
4,405,998 A *  9/1983   Brison ................ A47J 43/0755
                                                        366/129
(Continued)

FOREIGN PATENT DOCUMENTS

CN    203506469 U    4/2014
DE       1037088 B    8/1958
(Continued)

OTHER PUBLICATIONS

International Search Report with Written Opinion of the International Searching Authority, dated Jul. 1, 2016, with respect to International Application No. PCT/EP2016/058528.
(Continued)

*Primary Examiner* — Charles Cooley
(74) *Attorney, Agent, or Firm* — Scott R. Cox

(57) ABSTRACT

An implement for stirring or comminuting, containing a drive motor arranged in a motor housing, a stem, in which a shaft connected to the drive motor in a rotationally rigid manner is mounted, and which is divided into an inner and (Continued)

an outer assembly, wherein the outer assembly has a shield at an end remote from the motor housing, and a working part surrounded by the shield, wherein the shaft is guided in an axially immovable manner in the inner assembly and the inner assembly is axially movable relative to the outer assembly. The working part is fixedly connected to the stem and is mounted in an axially immovable manner in the inner assembly, such that the working part can move in relation to the shield.

14 Claims, 6 Drawing Sheets

(51) Int. Cl.
*B01F 7/00* (2006.01)
*A47J 43/06* (2006.01)
*A47J 43/08* (2006.01)

(58) Field of Classification Search
CPC .......... A47J 2043/04409; A47J 43/0705; A47J 43/0722; A47J 43/07; B01F 13/002; B01F 7/00616; B01F 7/00275; B01F 2215/0014; B01F 2215/0422; B01F 7/00608
USPC .................................. 366/129, 331
See application file for complete search history.

(56) References Cited

U.S. PATENT DOCUMENTS

| | | | | |
|---|---|---|---|---|
| 5,647,546 | A * | 7/1997 | Sinovas | A47J 43/0711 241/282.2 |
| 5,810,472 | A * | 9/1998 | Penaranda | A47J 43/0711 220/601 |
| 5,836,684 | A | 11/1998 | Safont et al. | |
| 5,863,118 | A * | 1/1999 | Ackels | A47J 43/0711 366/129 |
| 6,293,691 | B1 * | 9/2001 | Rebordosa | A47J 43/0711 366/129 |
| 7,866,879 | B2 * | 1/2011 | Moschetti | A47J 43/0711 366/129 |
| 8,033,712 | B2 * | 10/2011 | Calange | A47J 43/0705 366/129 |
| 8,038,338 | B2 * | 10/2011 | Maleiro Vilarino | A47J 43/0705 366/129 |
| 8,454,223 | B2 * | 6/2013 | Lameiro Vilarino | A47J 43/0705 366/129 |
| 8,556,203 | B2 | 10/2013 | Unteregger et al. | |
| 2008/0198693 | A1 * | 8/2008 | Lameiro Vilarino | A47J 43/0705 366/286 |
| 2011/0101138 | A1 * | 5/2011 | Unteregger | A47J 43/042 241/36 |
| 2018/0116464 | A1 * | 5/2018 | Wolf | A47J 43/06 |
| 2018/0160857 | A1 * | 6/2018 | Wolf | A47J 43/0711 |

FOREIGN PATENT DOCUMENTS

| | | |
|---|---|---|
| DE | 1219640 B | 6/1966 |
| DE | 1224006 B | 9/1966 |
| EP | 1900315 A1 | 3/2008 |
| EP | 1982624 A2 | 10/2008 |
| EP | 2127577 A1 | 12/2009 |
| EP | 2351501 A1 | 8/2011 |
| ES | 2005071 A6 | 3/1989 |
| JP | H11-206582A A | 8/1999 |
| JP | 2000-051103 A | 2/2000 |
| WO | 2012044306 A1 | 4/2012 |
| WO | WO2013016533 A1 | 1/2013 |
| WO | WO2013020571 A1 | 2/2013 |
| WO | WO2014022876 A1 | 2/2014 |
| WO | WO2014049329 A1 | 4/2014 |

OTHER PUBLICATIONS

International Preliminary Report on Patentability of the International Searching Authority, dated Oct. 24, 2017, with respect to International Application No. PCT/EP2016/058528.

* cited by examiner

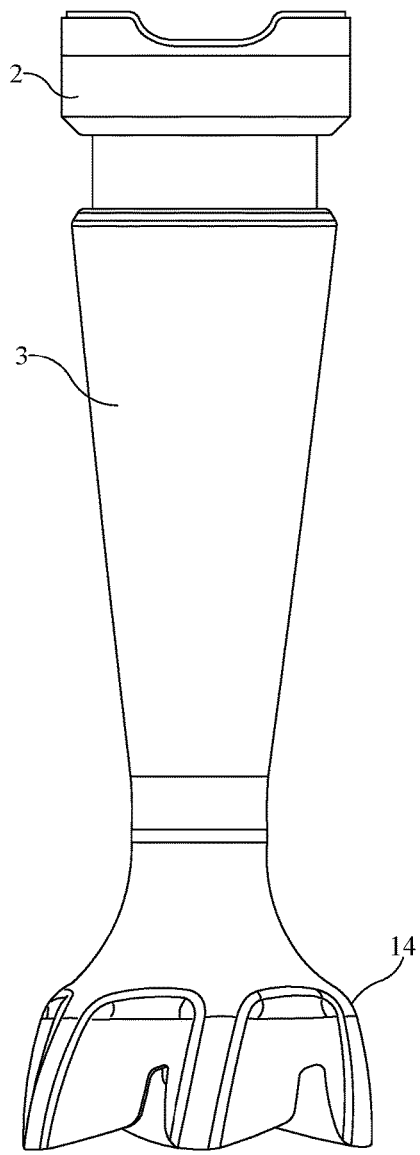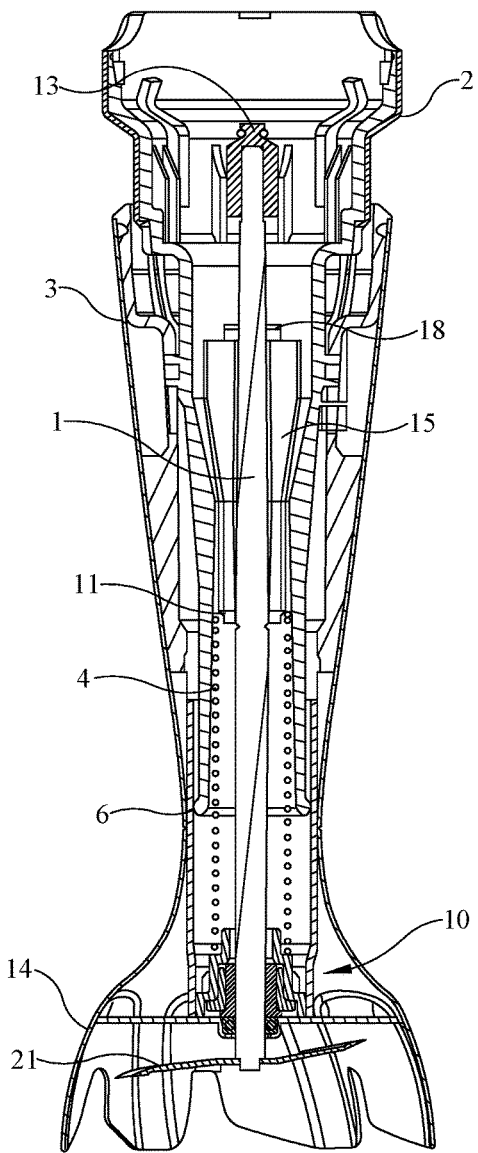
FIG. 1a
FIG. 1b

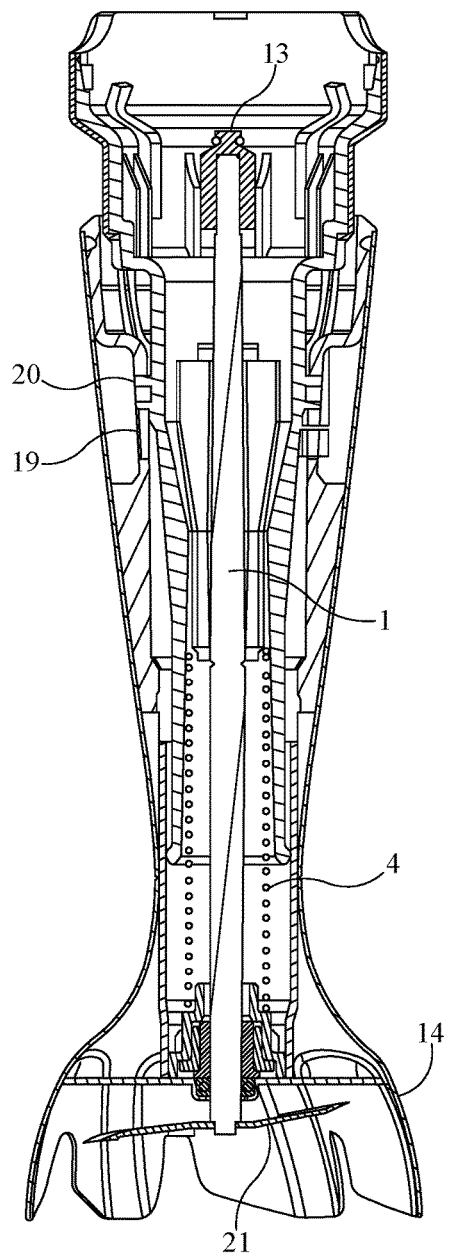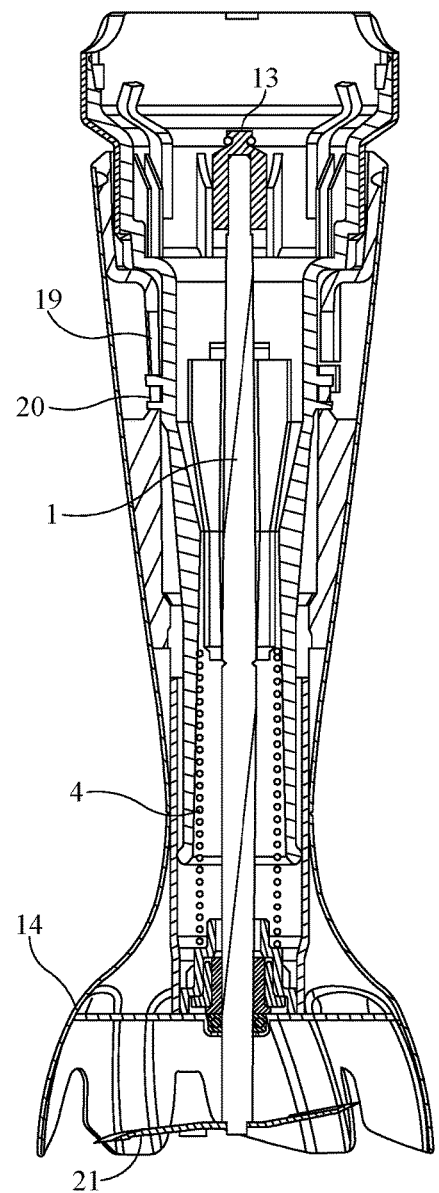
FIG. 5a                    FIG. 5b

IMPLEMENT WITH TELESCOPICALLY MOVABLE STEM FOR STIRRING OR COMMINUTING FOOD

The present invention relates to an implement, particularly an electrically driven hand blender, with a telescopically movable stem for stirring or comminuting food.

BACKGROUND ART

Conventional implements for stirring or comminuting food are known, for example, from WO 96/10944 A1 or EP 0 724 857 A1. A wide variety of such implements are being used particularly in daily food preparation, to comminute and blend foodstuffs, for example. One kind of implements that have become widespread in private households, but also in professionally run gastronomy venues, are hand blenders. Such hand blenders typically have a motor housing which adjoins an elongate housing part, the so-called stem, which in turn merges at its end into a shield having an open-bottomed end, the so-called bell. In the motor housing, a drive motor is arranged which drives a working shaft that is inserted through the stem and usually has attached at its end, in the region of the bell, a working part, for example a cutter in the form of a rapidly rotating blade in order to mix liquids and comminute solid foods.

The stem generally performs the adaption of the motor housing to the stem assembly and frequently supports, in an axial and radial direction, the shaft required for driving the cutter. The bell primarily has a protective function of making it more difficult for the user to contact the blade. Moreover, it serves to define a fixed distance between the blade and the bottom of the processing container (pot, blending beaker, etc.), optimize the flow around the blade and protect against splashes when immersed into liquids. The bell is dimensioned so as to completely enclose the cutter and to protrude a certain distance beyond the end of the shaft or the cutter as viewed in the direction of the axis of the working shaft.

In these devices that are available on the market, the blades are always fixed at a defined horizontal position within the bell. The blades are always fixedly mounted on a shaft and are mostly supported in a radially and axially rigid manner. The resulting processing space that can be reached by the cutter is thus limited. The "normal" upward and downward movement of the entire hand blender by the user makes this space only marginally larger. At the latest when the bell touches the bottom to be worked on, the space below the cutter is no longer reached by the cutter. Comminution then generally takes place only by way of flow effects. The product being cut is drawn along through the processing space by the flow and is thus comminuted, provided there is enough liquid around the product being cut.

Furthermore, in the known hand blenders, the stem may adhere by suction to the bottom of the container over and over again during processing, which may be extremely bothersome to the user since an increased amount of force is required to get the stem off the bottom again. This is mainly due to the position of the cutter within the bell, since the geometry of the cutter, which is helpful for its function, provides for a "propeller effect" and causes the entire stem to be adhered to the bottom to be worked on.

In order to avoid this adherence, the applicant has proposed a hand blender with an elastically deformable bell in DE 197 50 813 C2. When the hand blender is placed on the bottom in the blending beaker during processing, the bell can deform due to axial pressure exerted by the user and can thus bring the cutter closer to the container bottom and consequently displace the cutter axially in relation to the edge of the bell.

Another approach has been proposed by the applicant with the hand blender of DE 195 04 638 A1, in which the negative pressure occurring during adhesion is eliminated by a valve disposed in the bell as a flow channel. In a further embodiment, an rpm-dependent relative displacement of bell and working part is performed in order to open an additional flow channel.

However, the means for displacing the shaft which are required for this are extremely complicated mechanically and thus very expensive. In addition, the user cannot himself determine the position of the blade in relation to the bell as a whole in order to bring the blade closer to large pieces of food which would not otherwise be picked up by it, and also to freely displace the blade axially in the processing space of the bell. The reason is that it frequently happens that a larger piece of the material being cut gets stuck in the region below or above the cutter and cannot be comminuted by the edges of the blade. Moreover, some pieces of food lie flat on the bottom of the pot so that the cutter cannot reach them. This increases the processing time, and the result will be of inferior quality, too.

A hand blender having the features is known from document DE 698 26 868 T2.

SUMMARY OF THE INVENTION

Accordingly, it is an object of the invention to enable the user to actively modify the horizontal (axial) position of the working part during processing and thus extend the processing space of the working part. This object is achieved by an implement having the features.

According to the present invention, an implement for stirring or comminuting food comprises a drive motor arranged in a motor housing, a stem, in which a shaft that can be connected to the drive motor in a rotationally rigid manner is mounted, and which is divided into an inner and an outer assembly, wherein the outer assembly has a shield at its end away from the motor housing, and a working part surrounded by the shield. The shaft is guided in the inner assembly in an axially immovable manner and the inner assembly is axially movable relative to the outer assembly. The working part is fixedly connected to the shaft and is mounted in the inner assembly in an axially immovable manner, such that the working part is movable in relation to the shield.

Hereinafter the direction pointing from the drive part to the motor housing will also be referred to as "up" and the opposite direction as "down".

The stem according to the invention is therefore substantially divided into two parts or two assemblies, an inner and an outer assembly. The inner assembly serves as a "solid" interface to the known motor housing and performs further functions, which are described below. The outer assembly comprises most of the external geometry, as well as the shield at the bottom end, for example in the form of a so-called bell. This assembly also performs additional functions. Due to the fact that the outer assembly is axially movable relative to the inner assembly, the stem is designed like a telescope, which can also characterize its external appearance, for example in the top third of the external geometry. This telescopic construction allows at least part of the inner assembly to "plunge" into the outer assembly.

The working part, which in the case of a hand blender is represented by a cutter, is firmly connected to the shaft in the usual manner, thereby transferring the rotation of the motor to the cutter. Due to the axial guidance inside the inner assembly, the connection between shaft and motor remains constant throughout processing and no axial movement is possible between inner assembly and shaft. However, since the outer assembly can move relative to the inner assembly, this movement also acts between bell and cutter.

In the existing prior art, the fixed axial position of the working part relative to the shield or the bottom end of the stem was a compromise to equalize performance in liquid and solid substances as far as possible. The consequence of this is that maximum performance could not be achieved in either of these processing situations and the above-mentioned disadvantages had to be taken into account. The implement according to the invention for stirring and comminuting food allows a greater distance of the working part (e.g. cutter) from the bottom edge of the shield (e.g. bell) and this serves to reduce the suction effect in liquid foods and the tendency to splash. However, if the user wishes to increase the cutting performance in solid foods or to reach unprocessed parts of the food, he can exert pressure on the implement in the usual way. But in contrast to the prior art, when the user does so, the inner assembly pushes into the outer assembly so that the working part, which is mounted in the inner assembly in an axially immovable manner, is exposed further downward relative to the shield, so that it is better able to penetrate into the food being processed and can even reach and process pieces that are right up against the bottom of the container.

The implement according to the invention is further characterized by its simple design, straightforward use and easy cleaning.

The driveshaft is preferably supported in the inner assembly via an axial bearing and the force is transmitted from the axial bearing to the driveshaft via a locking device attached to the driveshaft. This can consist of a U-shaped washer and a rolling, for example, preferably provided underneath the axial bearing, but also of other types of locking device known to a person skilled in the art. Rolling is a method of producing a form fit on the level of the shaft diameter (similar to a shaft circlip). This involves constricting the driveshaft at one point by means of a "pointed" roll that rotates in parallel. The material displaced in front of and behind the constriction builds up over the shaft diameter, so that it no longer fits through the relatively close-fitting U-shaped washer. This ensures in an easy-to-implement manner that no axial movement is possible between inner assembly and shaft.

It is also advantageous for the outer assembly to have a radial slide bearing for the shaft at its end remote from the motor housing. A radial bearing of this type is, for example, a slide bearing bush (particularly a bronze one), which has no axial function and therefore provides sliding support in the axial direction. Thus the bearing can absorb the bearing forces most effectively in the immediate vicinity of the working part, where the applied torque is at its maximum.

It is particularly advantageous for the radial slide bearing to be braced against the outer assembly in a flexible bushing. Due to this flexibility, the bearing assembly that bears the shaft so that it is radially fixed and slides axially in the lower part of the outer assembly, is able to compensate for normal manufacturing tolerances. Moreover, this "soft bearing" substantially reduces the noise generated in operation, since this connection does not transmit the vibrations to the outer assembly via "hard" components, which would then increase the amount of noise.

According to a particularly preferred embodiment, an elastic element is provided between the inner and the outer assembly to axially pretension the outer assembly relative to the inner assembly. In this way, the two assemblies can be forced into a default position relative to each other, in which the inner assembly is pushed out of the outer assembly, thereby bringing the working part into its uppermost position in the shield. This position is advantageous when processing liquids since in this case the shield must be immersed relatively deeply into the liquid in order to process it with the working part, and the shield consequently does not allow splashing.

Longitudinal guides can be provided on the outer assembly to interact with corresponding guide elements provided on the inner assembly. In this case the guide elements run in the longitudinal guides. This combination of longitudinal guides and guide elements constitutes limit stops for the travel and is therefore responsible for the final position of the inner assembly in the default position imposed, for example, by the elastic element, as well as for the one-off latching during mounting of the outer onto the inner assembly, and also prevents the inner assembly from being twisted with respect to the outer assembly, thereby offering protection against misuse.

The longitudinal guides and guide elements can preferably be provided in opposing pairs in order to distribute, and thus optimize in terms of force, the said two functions among different pairs of longitudinal guide and guide element.

In an advantageous development, centring means for the shaft are provided on the inner assembly. These centring means have the function of pre-centring the shaft in the inner assembly within a narrow interval, which is helpful to facilitate "threading" of the shaft coupling on the motor housing on the of the stem.

It is also advantageous to axially fix the shaft by way of another locking element attached in the inner assembly. This fixing, which is preferably provided above the axial bearing, additionally protects against undesired axial displacement of the shaft in relation to the inner assembly. To this end, the aforementioned centring elements can serve as a supporting surface for the locking element, which, due to functional integration, allows for fewer components and thus simpler production.

In a preferred embodiment of the invention, the inner assembly is braced against the outer assembly by one or more slide bearings. The slide bearing can consist of two slide bearing shells which are each composed, on the one hand, of different synthetic materials or plastic, and, on the other, of metal, particularly stainless steel. This permits low-friction and thus low-wear, yet also play-free displacement of the assemblies relative to each other.

In addition, the previously described embodiments of the invention can be combined in a particularly advantageous manner with a measure which additionally improves the effect of the invention. In this case, the implement preferably comprises a radially extending cutter attached to the working end of the shaft, said cutter having a cutting edge that lies on a front side in the rotational direction and defines a circular cutting zone when circulating and having a milling rib which protrudes upwards from the cutter in an axial direction and is oriented so as to produce a milling effect when circulating and defines a corresponding milling zone that extends from the hub to the cutting zone of the cutter. The milling zone and the cutting zone are directly adjacent to each other so that there are no passive zones between them. Thus the cutting zone defined by circulation of the cutting edge is extended inwards towards the hub by a milling zone, thereby collectively enlarging the active comminution zone in comparison to conventional cutters. The basic idea is that the cutting zone only extends radially inwards to a certain point, so that an acceptable cutting speed can still be achieved, and the milling zone defined by the milling rib then follows immediately on from it. The milling zone preferably extends as far as the cutting zone of the cutter, without substantially overlapping said zone. Since it is not possible to draw an exact and clear delineation between the (radially inner) end of the cutting zone and the (radially outer) end of the milling zone due to the structural transition from the cutting edge to the milling rib, "no overlapping" of the two zones is to be understood to mean that the cutting zone defined by the still unmodified cutting edge (before the transition) and the milling zone defined by the still unmodified milling edge (before the transition) do not overlap. In other words, the milling zone merges into the cutting zone in the sense that the milling effect of the milling rib diminishes to zero at the transition and the cutting effect of the cutting edge starts to increase from zero.

Due to its extension, the milling edge protruding axially out of the cutter is not oriented substantially along a tangent to the rotational direction of the cutter, as in the folded elements of the prior art, that is to say with an attack direction oriented substantially perpendicular to the rotational direction, but has attack directions, at least in regions along its extension, which form a sharp angle ("angle of attack") of 45° or less, preferably 35° or less, to the rotational direction. In the field of cutting blades, direction of attack is understood to mean the normal on the striking edge or striking surface, that is to say the direction in which the striking edge (cutting edge) of a blade meets the material being cut, for example the angle between the direction of attack and the direction of rotation of a radially running edge is 0°. In the milling rib, the striking surface is the side face of the milling rib pointing in the rotational plane. The milling edge preferably has an attack angle of 45° or less, particularly preferably 35° or less, along its entire extension.

In the present case, a cutting edge is understood to be a horizontally cutting edge of the cutter, which is therefore able to make cuts in the rotational plane. The cutting edge is created in that the blade metal is deep drawn at a (deep drawing) angle of 20°, for example, and then sharpened by grinding. The grinding is done in the rotational plane of the blade, so that the said angle therefore determines the so-called wedge angle of the blade, that is to say the angle between the rotational plane and a (top or bottom) surface of the cutting edge.

The axial direction is a direction perpendicular to the rotational plane of the cutter. Within the meaning of the present invention, the hub is that region of the blade which receives the shaft in a receiver, so, for example, comprises an opening or mounting option for inserting and fastening the shaft, and also the region immediately surrounding the receiver, which is necessary for the structural strength of the connection of driveshaft to blade/cutter. In the known blades, this region is mostly a circular area, from which the cutter or cutters extend substantially radially but, according to the present invention, can also have geometries that differ from the circular form.

This blade arrangement extends the functionality of the blade in a very advantageous manner and improves, in particular, the effects of the displaceability of the cutter in accordance with the invention. In addition to cutting with the sharp cutting edges of the cutter of the blade in the circumferential direction, there is also an effective milling functionality of the milling rib in the compression direction. This in turn enables the cutter to cut solid food more effectively and more quickly. The effect of the blade arrangement according to the invention is based on the fact that solid foods can be milled away by light pressure and rotation, so that the cutting zones of the cutters can be pushed further into the food. This is made possible in that the novel arrangement of the milling rib makes the "passive" central zone as small as possible. Even with blades with a milling rib only running on one side (that is to say a milling rib only provided on one cutter), as a result of the extension of the milling rib from the hub to the cutting edge, only a very small passive zone is left around the receiver for the shaft and the effective area of this zone is a circular area of extremely small diameter. The compressive force necessary to penetrate into the food is therefore likewise correspondingly low.

According to a particularly preferred embodiment, the milling rib extends from a position on the edge of the hub, which substantially lies at an angle of preferably 45° to the radial central axis of the cutter relative to the centre of rotation, up to the cutting edge. The milling rib therefore acts as an extension of the cutting edge. Due to the fact that the milling rib starts from a position rotated by 45° from the extension of the blade cutter and then extends along the edge of the hub and the front edge of the cutter to the cutting edge, the attack angle decreases along the milling rib from nearly 90° at the inner end of the rib outwards and drops below 45° before the milling rib reaches the cutting edge, which means that, although the milling effect is slightly less than that of the radially oriented rib with attack angle of substantially 0°, the risk of the food being entrained in rotation is eliminated. This therefore guarantees effective milling of the food. Moreover, areas in which food residues could collect (e.g. corners or small gaps of a few millimetres between milling edge and cutting edge) are avoided, thereby making the blade easier to clean. Finally, the eccentric arrangement of the milling edge relative to the centre of rotation allows larger pieces of food to be conveyed outwards into the cutting zone, where they can be cut up more effectively.

In a particularly preferred embodiment of the blade arrangement, the milling rib is arranged on the back side of the cutter in the rotational direction. This has technical manufacturing advantages, since the milling edge is bent up on one side of the sheet metal blank forming the cutter, which is away from the cutting edge side, so that the corresponding area is not compromised by the bending up process. Once again, this avoids corners in which food residues could collect and the blade arrangement is easy to clean. Moreover, due to the spatially separated design, the milling rib can be ground separately from the cutting edge as a folded tongue of sheet metal during manufacture. Finally, the eccentric arrangement of the milling rib once again allows larger pieces of food to be conveyed outwards.

BRIEF DESCRIPTION OF THE DRAWINGS

FIG. 1a) shows a lateral view and FIG. 1b) a longitudinal sectional view of the stem of the implement according to the invention.

DETAILED DESCRIPTION

Figure 2:
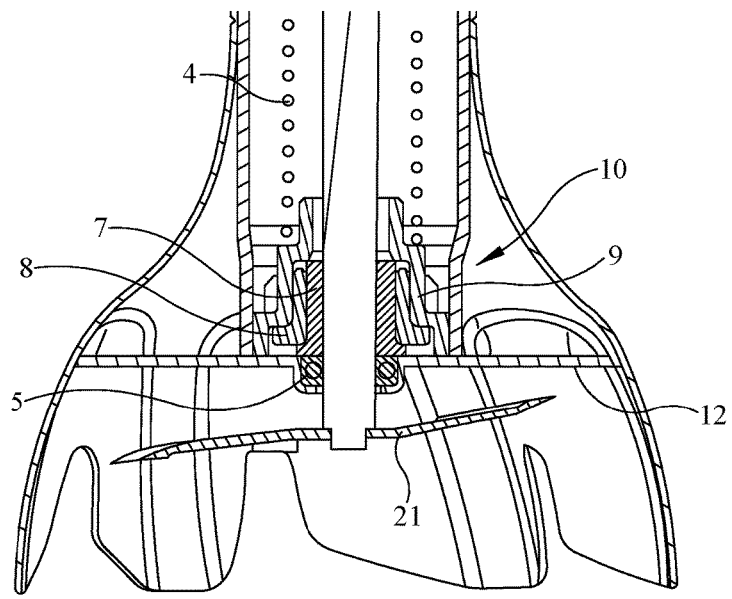
FIG. 2 shows an enlarged sectional view of the bearing assembly of the stem of FIGS. 1a) and 1b), FIG. 3a) shows a perspective view of a detail of a rolling for axially locking the shaft and FIG. 3b) shows a sectional view of the connection between rolling and U-shaped washer on the shaft, FIGS. 4a) and 4b) show perspective views of details of two embodiments of the top part of the inner assembly of the stem of FIGS. 1a) and 1b), FIGS. 5a) and 5b) show sectional views of the stem of the implement according to the invention with the blade in the higher or lower position, respectively, FIGS. 6a) and 6b) show a perspective view and a plan view from underneath of a blade arrangement with a milling rib extending toward the hub in the extension of the cutting edge in accordance with another embodiment of the invention.

FIG. 1a) shows a lateral view of the stem of an implement according to the invention, in this example a hand blender. The stem is divided into an inner assembly 2 and an outer assembly 3. The inner assembly 2 is capable of moving telescopically into and out of the outer assembly 3. As can be seen in the longitudinal sectional view of the stem in FIG. 1b), the shaft 1 is guided in the inner assembly 2 and is supported therein by means of an axial bearing 11. In addition, the inner assembly 2 is configured so that it can be detachably coupled with the hand blender motor housing (not shown here), which simultaneously forms the handle for the user, wherein no relative movement is allowed between motor housing and inner stem assembly 2 in the coupled state. This also connects the shaft 1 with the motor shaft via the shaft coupling 13.

At the lower end of the outer assembly 3 there is a bell-shaped shield 14 for the cutter 21 (working part) attached to the bottom end of the shaft 1, said cutter being preferably completely surrounded by the shield (bell) 14. On the inside, the shield has a cover plate 12, which, together with the shield 14, forms a processing space that is sealed off from the outer assembly 3. Furthermore, in the outer assembly there is a radial slide bearing 7 in close proximity to the cutter 21, since it is here that the torque is at its greatest. Here, the radial slide bearing 7 is provided on the cover plate 12 of the shield 14, since this component is closest to the cutter 21. The radial slide bearing 7 is mounted in a flexible collar bushing 8, which is surrounded by a bearing sleeve 9, which fixes the bushing 8 and the radial slide bearing 7 on the cover plate 12. Radial slide bearing 7, collar bushing 8 and bearing sleeve 9 form a bearing assembly 10 (see FIG. 2). The flexible collar bushing 8 allows a slight rotation of the radial slide bearing 7 around an imaginary fulcrum in the centre. If the motor portion (not shown here) is put onto the shaft, the shaft 1 is pushed coaxially to the motor shaft in the upper region via the shaft coupling. Due to manufacturing-related tolerances or an eccentricity of the motor with respect to the adaption, a "rigidly" clamped shaft without flexible collar bushing would easily bend out of shape. In turn this would lead to increased wear of the bearing and a greater amount of noise during operation. The "soft" bearing with the aid of the flexible collar bushing 8 serves as a remedy in this case and the bearing assembly 10 with collar bushing 8 is therefore capable of compensating for normal manufacturing tolerances or the forces due to an eccentrically coupled motor.

A spring 4 located on the inside in the inner assembly 2 is supported at the bottom by means of a bearing assembly 10 with the radial slide bearing 7 on the outer assembly 3 (FIG. 2) and at the top abuts the inside of the inner assembly 2, so that it forces the two assemblies into a default position, in which the inner assembly 2 is pushed out of the outer assembly 3 at the top, thereby bringing the cutter 21 into its topmost position in the processing space (see FIG. 5a). The bearing assembly 10 is thereby held in position by the spring 4 pressing on the bearing sleeve 9. The limit stops for this travel are attached on the inside of the outer assembly 3 in the form of four longitudinal grooves 19 (longitudinal guides) distributed over the circumference. Ribs 20 (guide elements) attached on the outside of the inner assembly 2 run in said grooves. The four ribs 20, two of which can be seen in FIGS. 5a) and 5b), perform two functions and are divided into two opposing pairs. The one pair determines the end position of the inner assembly 2 in the default position imposed by the spring 4 and also serves for one-off latching behind during mounting of the assembly. The second pair of ribs prevents the inner assembly from twisting relative to the outer assembly ("misuse"). In an alternative (not shown), only two longitudinal grooves are provided on the inside of the outer assembly and accordingly two ribs on the outside of the inner assembly, one longitudinal groove-rib combination determining the axial limit position of the inner assembly and the other longitudinal groove-rib combination preventing mutual twisting of the two assemblies.

Figure 3A:
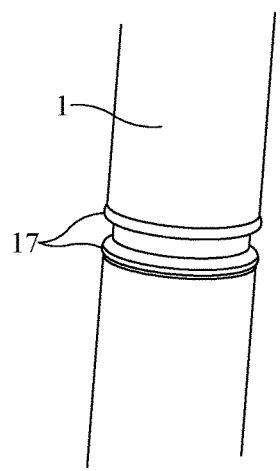
Figure 3B:
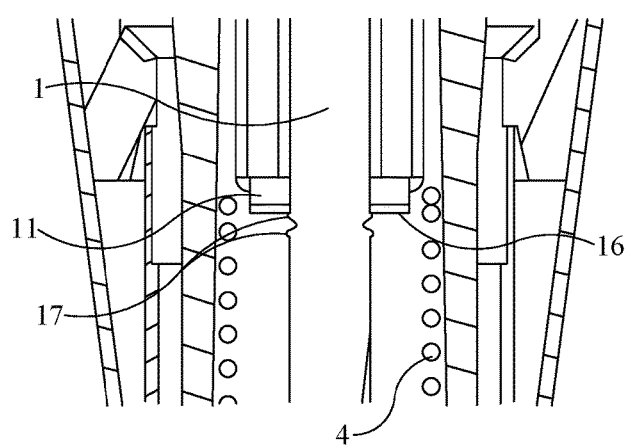

Since the requirements for coaxiality of the shaft coupling are high, centring ribs 15 are attached in the upper portion of the inner assembly 2 by way of a centring means and said centring ribs "pre-centre" the shaft radially within a narrow interval. This is helpful to facilitate "threading" the shaft coupling (not shown) on the motor housing onto the shaft coupling 13 of the stem. In the interests of functional integration, these centring ribs 15 also form the abutment surface of the axial bearing 11. Power transmission from the axial bearing 11 onto the shaft 1 is effected via a U-shaped washer 16 and a rolling on the shaft 1 (see FIGS. 3a and 3b), which thus represent means for axially locking the shaft below the bearing. The rolling results in a constriction on the shaft and a bulge 17 in front of and behind the material displaced by the constriction that projects above the shaft diameter. This means that it no longer fits through the relatively close-fitting U-shaped washer. The shaft 1 is additionally axially fixed in the inner assembly 2 by a further safety washer 18 on the shaft 1 above the centring ribs 15 of the inner assembly 2. The outer assembly 3 further also comprises a shaft seal 5 (FIG. 2), to reduce contamination from wetting of the shaft.

Figures 4A, 4B:
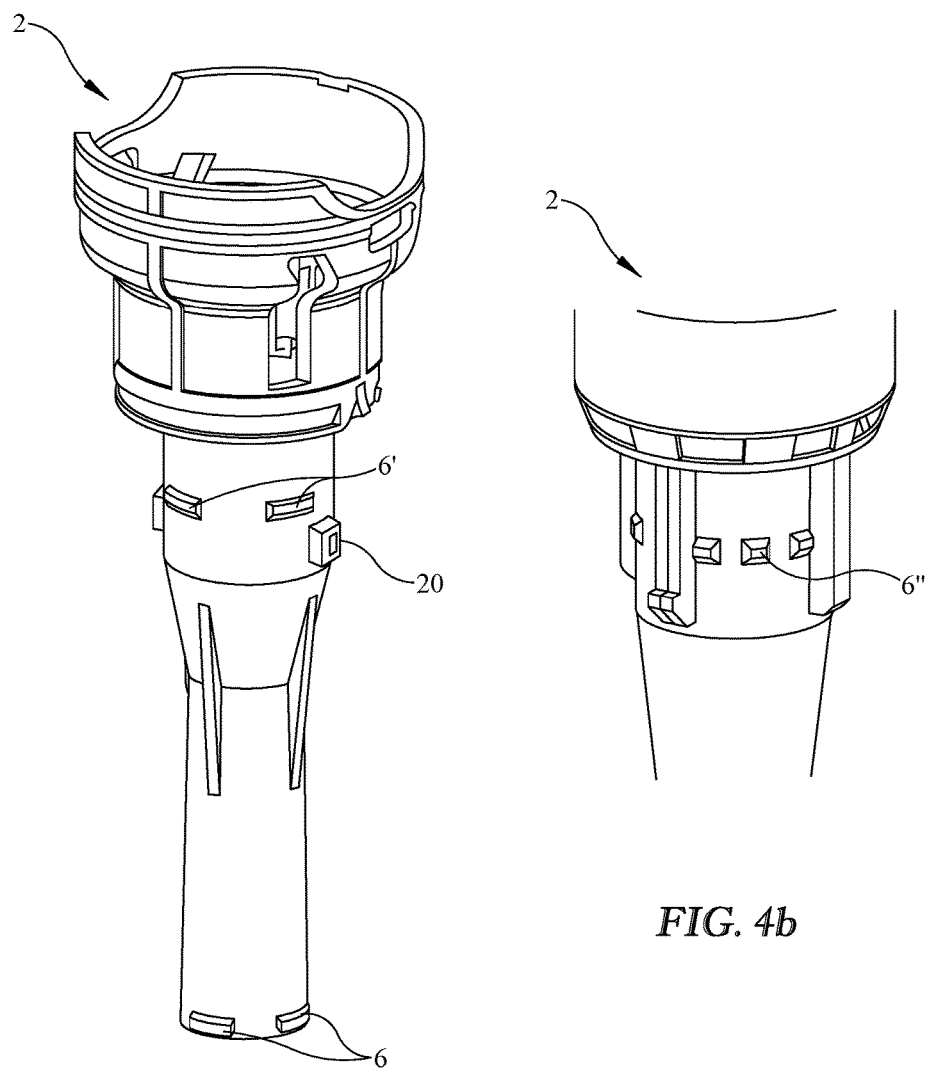

The bearing of the two assemblies 2 and 3 required for mutual axial displacement is provided at two places by slide bearings 6, 6' of simple geometry, wherein the half of the slide bearing provided at the lower end of the inner assembly 2 is represented by a broadening 6 that partially protrudes above the circumference and the opposite half of the slide bearing is represented by a cylindrical slide sleeve attached to the inside of the outer assembly 3. At the top end of the inner assembly 2, however, there can be provided projections 6' that are distributed around the circumference and are supported against a smooth bearing surface on the inside of the top portion of the outer assembly 3. Two different designs of these slide bearing projections 6' and 6" are shown in FIGS. 4a) and 4b). A possible slide pairing is between two different plastics, the other possible slide pairing between plastic and metal (e.g. stainless steel). The bearing points 6, 6' (6, 6") are attached as far apart as the construction space allows, in order to prevent a self-locking effect in use.

In the construction described above, the position of the cutter 21 in the starting position is further up than the usual position (away from the container base) (FIG. 5a), in order to reduce suction on the container base and also, due to the division, the stem allows an axial movement of the cutter 21 towards the container base against the force of the spring 4. If, during operation, the user presses axially on the motor housing that simultaneously serves as a handle and is connected to the inner assembly 2, then the mounted shaft is able to transfer this travel through the inner assembly 2 via the shaft 1 mounted in it in an axially o manner to the cutter. During this process, the external geometry of the outer assembly 3 can remain unchanged. To this end, the inner assembly 2 plunges a certain distance into the outer assembly 3 (FIG. 5b) until there the inner assembly 2 comes up against a defined limit stop formed by the interaction of longitudinal grooves 19 and ribs 20. Thus, in the default state, in which the user does not exert any pressure on the stem and the cutter 21 is in the uppermost position in the shield 14 in the processing area (FIG. 5a), the suction can be massively reduced and, at the same time, the working area of the cutter 21 can be increased downwards due to the travel that is possible in the axial direction, in order to reach inaccessible pieces of food, for example.

Figure 6A:
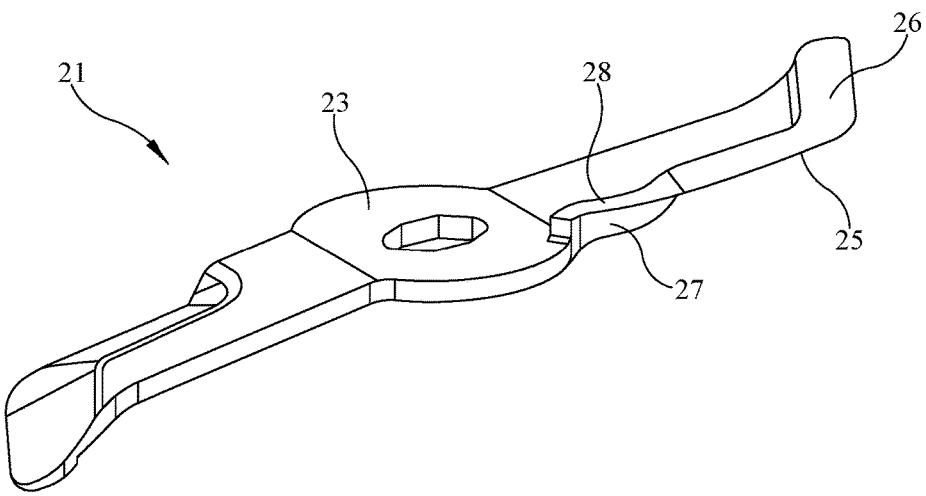
Figure 6B:
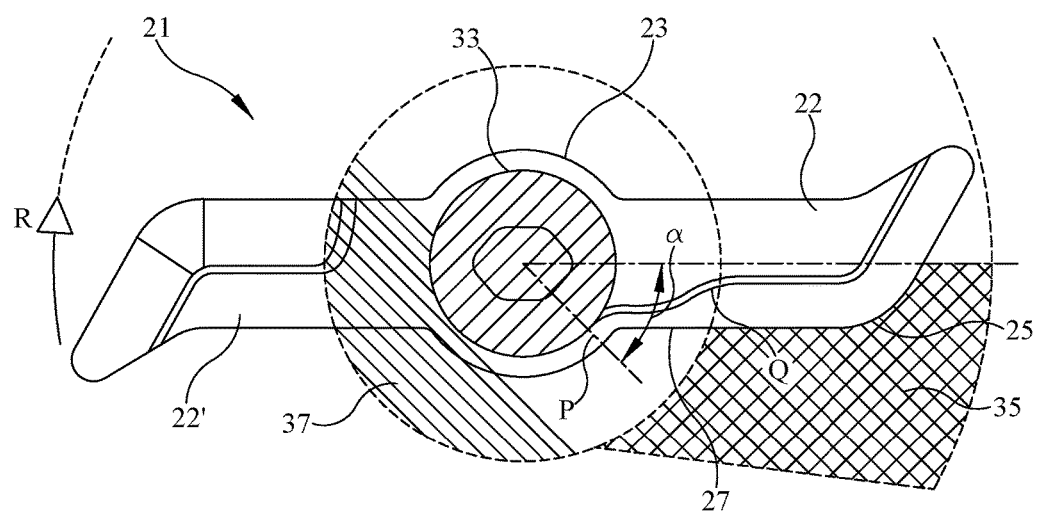

FIGS. 6 and 7 show a detail of the blade arrangement 21 that is attached to the (lower) working end of the shaft 1 of the hand blender and is composed of two oppositely extending cutters 22, 22'. The blade arrangement according to the invention comprises a blade 21 with two diagonally opposed cutters 22, 22', each of which has a cutting edge 25 ground at a wedge angle of 20°. The cutters 22, 22' are angled out of the rotational plane, cutter 22 downwards and cutter 22' upwards, the indications of position relating to the cutters in their operational state being "upside down" compared with FIGS. 6 and 7. On the right-hand cutter 22 in FIG. 6a, one can see the grinding surface 26, which is turned downwards in operation and upwards in the Figure, while the grinding surface of the left-hand cutter 22 is turned up (and down in the Figure) and is consequently not visible in this plan view from underneath. In the centre of the blade arrangement 21 is the hub 23, mounted in the central bore of which is the axial shaft 1, which transmits its rotation generated by the motor of the hand blender to the blade arrangement. The blade arrangement 21 itself is made from a 2-mm-thick sheet, for example, and is usually made of metal. Ceramic is also eligible as a material for a blade of this type.

According to a preferred embodiment, a milling rib 27 is provided on the cutter 22. The axially protruding milling rib 27 is arranged in the extension of the cutting edge 25, starting at a position P, which is turned away from the extension of the cutter 22 by $\alpha=45°$, and extending first substantially tangentially along the edge of the hub 23 (of the plate forming the hub) and then along the leading edge of the cutter 22 to the inner end of the cutting edge 25. This orientation of the milling rib 7 means that the attack angle at the position P is almost 90° (normal on the "forwards" facing surface of the milling rib is perpendicular to the direction of rotation) and then decreases to approximately 20° by point Q on the inner end of the cutting edge.

The axially turned grinding surface 28 of the milling rib 27 and the axially turned grinding surface 26 of the cutting edge 25 together form a total grinding surface, the minimization of which, like the minimization of the passive central zone, helps to minimize the amount of force required for penetrating the food. The milling rib 27 can be angled out of the blade sheet or, as illustrated, be directly punched out and ground, which, due to the minimal plate thickness (approx. 2 mm) of the sheet used for producing the cutter 22, results in a very small grinding surface 28 in both cases and hence a very small contribution to the total grinding surface.

As is shown in the embodiment illustrated here, the surface of the cutting edge 25 (which forms the wedge angle of preferably 20° with the rotational plane/grinding surface 26) continuously merges into the milling rib 27, that is to say the wedge angle in the region of the transition from the cutting zone 35 to the milling zone 37 continuously increases from the wedge angle of the cutter 22, here 20°, up to an angle of 90°, at which the milling rib 27 projects out of the rotational plane of the cutter 22 (see the vertical front face of the milling rib 27 turned in the rotational direction in FIG. 6a). At the same time, the width of the grinding surface 26 of the cutting edge 25 can decrease in the rotational plane at the said transition to a width corresponding to the plate thickness, which helps to minimize the total grinding surface.

Figure 7A:
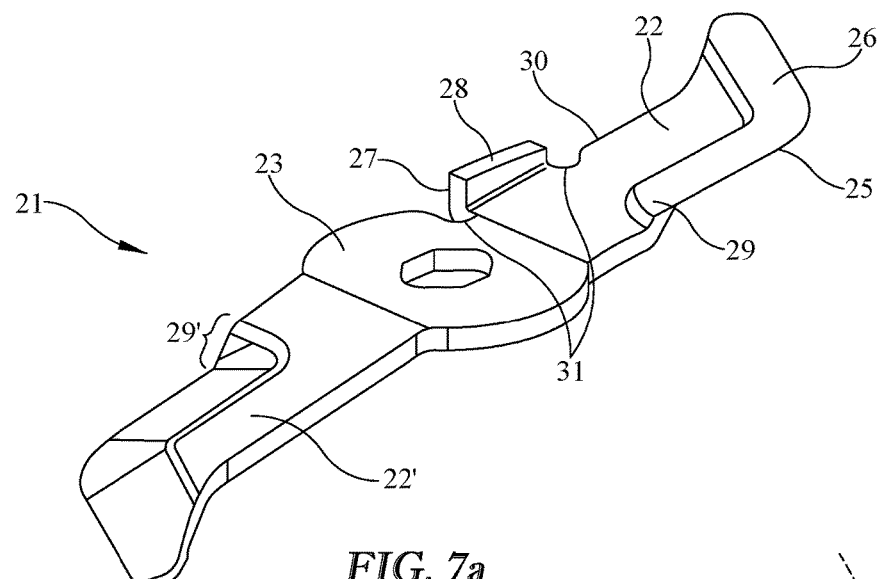
FIGS. 7a), 7b) and 7c) show a perspective view, a plan view from underneath and a lateral view of an alternative blade arrangement with a unilateral milling rib on the side opposite the cutting edge on the blade in accordance with another embodiment of the invention.

FIGS. 7a) to 7c) show a particularly preferred embodiment of the blade arrangement 21, in which the milling rib 27 protrudes axially at the edge 30 opposite the cutting edge 25. The milling rib 27 is therefore located on the back side of the blade 22 in the rotational direction. Since it does not run along a radius, the attack angle of the milling rib 27 is variable and is $\phi_1=30°$ at the inner end of the rib (angle between the normal on the milling edge $\vec{N}$, and the rotational direction $\vec{R}_1$), while it decreases to $\phi_2=15°$ at the outer end. The choice of this angle combines good milling performance with acceptable rotational resistance, which should not be too high, especially for solid foods. As can be seen in the lateral view of FIG. 7c), the grinding surface 8 is horizontal here, i.e. extends parallel to the rotational plane of the blade arrangement, while the two cutters 22 and 22' of the blade arrangement are angled downwards or upwards respectively relative to the hub portion 3 (N.B.: shown "upside down" in the drawing).

Figure 7B:
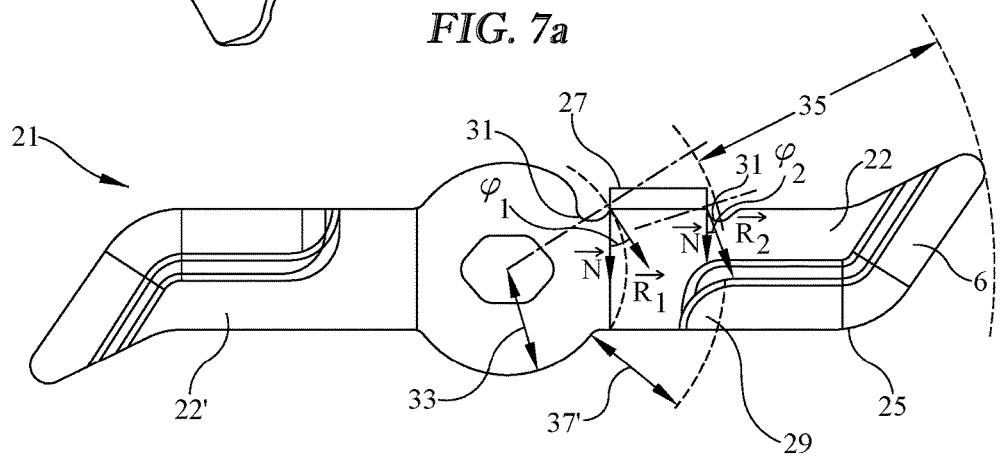
Figure 7C:
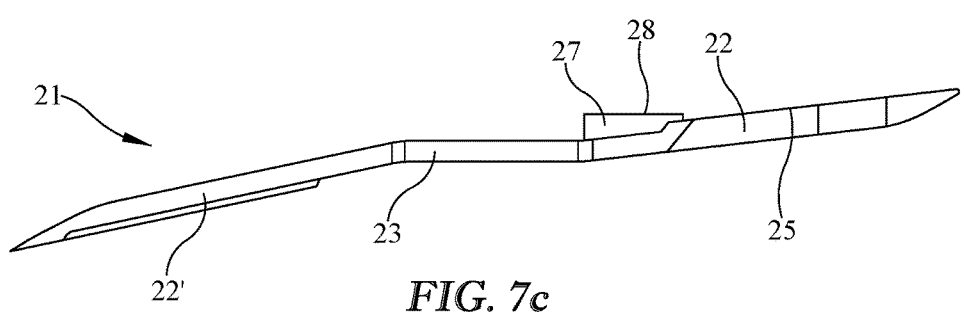

As can clearly be seen in the plan view of FIG. 7b), the milling rib 27 is surrounded by notches 31 on the inside and outside of the blade, said notches being created by the punching tool during manufacture and preventing tearing as the milling rib is bent up due to excessively small bending radii or warping of the cutter 22. One can also clearly see the division into zones, the radially outermost cutting zone 35 being defined by the circulation of the cutting edge 25. Following on from the unmodified cutting edge 25 (that is to say as long as the wedge angle is substantially constant) is a transition area 29, at which the wedge angle increases from the e.g. 20° of the cutting edge. Since this region does not have any cutting effect due to the rapid increase in the wedge angle to 90°, the cutting zone 35 only extends as far as the boundary between cutting edge 25 and transition area 29, as shown in FIG. 7b). The increase in the wedge angle can also be clearly seen at the transition area 29' on the other cutter 22', which is shown in FIG. 7a. In contrast, the milling zone 37 created by circulation of the milling rib 27 directly adjoins the cutting zone 35, without overlapping it. On the inside, the milling zone 37 adjoins the passive central zone 33, which is completely defined by the hub 23 in this case.

The invention claimed is:

1. An implement for stirring or comminuting food, comprising:
    a drive motor arranged in a motor housing,
    a stem, in which a shaft connected to the drive motor in a rotationally rigid manner is mounted, the shaft defining an axial direction, and which stem is divided into an inner and an outer assembly, wherein the outer assembly comprises a shield at an end remote from the motor housing, and a working part surrounded by the shield, wherein the shaft is guided in an axially immovable manner in the inner assembly and the inner assembly is axially movable relative to the outer assembly, wherein the working part is fixedly connected to the shaft and is mounted in an axially immovable manner in the inner assembly, such that the working part can move axially in relation to the shield, characterized in that an elastic element is provided between the inner and the outer assembly to axially pretension the outer assembly relative to the inner assembly.

2. The implement according to claim 1, wherein the shaft is mounted in the inner assembly via an axial bearing and force is transmitted from the axial bearing to the shaft via a locking device attached to the shaft.

3. The implement according to claim 2, wherein the shaft is axially fixed by a locking element attached in the inner assembly.

4. The implement according to claim 1, wherein the outer assembly further comprises a radial slide bearing for the shaft at its end remote from the motor housing, the radial direction being perpendicular to the axial direction.

5. The implement according to claim 4, wherein the radial slide bearing is braced against the outer assembly in a flexible bushing.

6. The implement according to claim 1, wherein longitudinal guides are provided on the outer assembly to interact with corresponding guide elements provided on the inner assembly.

7. The implement according to claim 6, wherein the longitudinal guides and guide elements are provided in opposing pairs.

8. The implement according to claim 1, wherein a centring element for the shaft is provided on the inner assembly.

9. The implement according to claim 1, wherein the inner assembly is supported by a slide bearing in relation to the outer assembly.

10. The implement according to claim 9, wherein the slide bearing consists of two slide bearing shells which are each composed of different synthetic materials or plastic on one slide bearing, and, on the other, of metal.

11. The implement according to claim 1, wherein the inner assembly is connected to the motor housing in an axially immovable manner.

12. The implement according to claim 1, further comprising a radially extending rotating blade attached to a working end of the shaft, the radially extending rotating blade is the working part, with a hub located at a centre of rotation of the blade, for receiving the shaft, wherein the blade comprises at least one radially extending cutter comprising a cutting edge that is disposed on a front side in a rotational direction which defines a circular cutting zone when circulating, and wherein the blade further comprises a milling rib which protrudes upwardly from the blade in an axial direction and is oriented so as to produce a milling effect when circulating which defines a corresponding milling zone that extends from the hub to the cutting zone of the cutter.

13. The implement according to claim 12, wherein the milling rib extends from a position at the edge of the hub, which lies at an angle of about 45° to a radial central axis of the cutter relative to the centre of rotation, up to the cutting edge.

14. The implement according to claim 12, wherein the milling rib is arranged on a back side of the cutter in the rotational direction.

\* \* \* \* \*